United States Patent
Mukherjee et al.

(10) Patent No.: US 8,171,328 B2
(45) Date of Patent: May 1, 2012

(54) STATE HISTORY STORAGE FOR SYNCHRONIZING REDUNDANT PROCESSORS

(75) Inventors: Shubhendu S. Mukherjee, Southborough, MA (US); Arijit Biswas, Holden, MA (US); Paul B. Racunas, Marlborough, MA (US); Steven E. Raasch, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 12/347,961

(22) Filed: Dec. 31, 2008

(65) Prior Publication Data

US 2010/0169693 A1 Jul. 1, 2010

(51) Int. Cl.
*G06F 15/16* (2006.01)
(52) U.S. Cl. ........................................ 713/375
(58) Field of Classification Search .............. 713/375
See application file for complete search history.

(56) References Cited

U.S. PATENT DOCUMENTS

| | | | |
|---|---|---|---|
| 5,845,060 A * | 12/1998 | Vrba et al. | 714/12 |
| 5,896,523 A * | 4/1999 | Bissett et al. | 713/400 |
| 6,233,702 B1 * | 5/2001 | Horst et al. | 714/48 |
| 6,948,092 B2 * | 9/2005 | Kondo et al. | 714/12 |
| 7,107,484 B2 * | 9/2006 | Yamazaki et al. | 714/12 |
| 2007/0022348 A1 | 1/2007 | Racunas et al. | |
| 2007/0113224 A1 * | 5/2007 | Bourdon et al. | 717/168 |
| 2008/0126819 A1 | 5/2008 | Moilanen et al. | |
| 2008/0196037 A1 * | 8/2008 | Ple | 718/107 |

FOREIGN PATENT DOCUMENTS

| | | |
|---|---|---|
| WO | 2010/078187 A2 | 7/2010 |
| WO | 2010/078187 A3 | 10/2010 |

OTHER PUBLICATIONS

Purser et al., A Study of Slipstream Processors, 2000, North Carolina State University, pp. 269-280.*
International Search Report and Written Opinion received for PCT Patent Application No. PCT/US2009/069384, mailed on Aug. 13, 2010, 9 pages.
International Preliminary Report on Patentability received for PCT Patent Application No. PCT/US2009/069384, mailed on Jul. 14, 2011, 6 pages.
Lafrieda et al., "Utilizing Dynamically Coupled Cores to Form a Resilient Chip Multiprocessor", 37th Annual IEEE/IFIP International Conference on Dependable Systems and Networks, Jun. 25-28, 2007, pp. 317-326.

* cited by examiner

*Primary Examiner* — Mark Connolly
(74) *Attorney, Agent, or Firm* — Trop, Pruner & Hu, P.C.

(57) ABSTRACT

Embodiments of an invention for synchronizing redundant processors using state history are disclosed. In one embodiment, an apparatus includes two processors, state storage for each processor, and control logic. Each processor is to execute the same instructions. The state storage is to store compressed processor state information for each instruction executed by the processors. The control logic is to synchronize the two processors based on entries from the state storage.

20 Claims, 2 Drawing Sheets

STATE HISTORY STORAGE FOR SYNCHRONIZING REDUNDANT PROCESSORS

BACKGROUND

1. Field

The present disclosure pertains to the field of information processing, and more particularly, to the field of error mitigation in information processing systems.

2. Description of Related Art

As improvements in integrated circuit manufacturing technologies continue to provide for greater levels of integration and lower operating voltages in microprocessors and other data processing apparatuses, makers and users of these devices are becoming increasingly concerned with the phenomenon of soft errors. Soft errors arise when alpha particles and high-energy neutrons strike integrated circuits and alter the charges stored on the circuit nodes. If the charge alteration is sufficiently large, the voltage on a node may be changed from a level that represents one logic state to a level that represents a different logic state, in which case the information stored on that node becomes corrupted. Generally, soft error rates increase as the level of integration increases, because the likelihood that a striking particle will hit a voltage node in a die increases when more circuitry is integrated into a single die. Likewise, as operating voltages decrease, the difference between the voltage levels that represent different logic states decreases, so less energy is needed to alter the logic states on circuit nodes and more soft errors arise.

Blocking certain types of particles that cause soft errors may be difficult, so data processing apparatuses often include techniques for detecting, and sometimes correcting, soft errors. These error mitigation techniques include redundancy. With redundancy, two or more hardware contexts execute identical copies of a program or instruction stream. Each hardware context may consist of any hardware capable of executing the instruction stream, such as a logical processor in multithreaded processor, a core in a multicore processor, a full processor in a multiprocessor system, or a full system including a processor, system memory, and possibly input/output (I/O) devices. The outputs from the two or more hardware contexts are compared, and, if they differ, an error handling mechanism may be invoked to determine if an error has occurred and/or handle the error.

In some implementations of redundancy, the two or more hardware contexts operate in lockstep, meaning that they each execute the same instruction in the stream simultaneously. In other implementations of redundancy, the two or more hardware contexts may execute the identical copies of the instruction stream, but not in lock-step or synchrony with each other, so that may each be executing a different instruction in the stream at the same time. Delivery of an input or an interrupt at a time when the hardware contexts are not in synchrony may cause an output from one context to differ from an output from another context, which may result in the error handler being invoked, even if the output mismatch did not result from an actual error.

BRIEF DESCRIPTION OF THE FIGURES

The present invention is illustrated by way of example and not limitation in the accompanying figures.

DETAILED DESCRIPTION

Figure 1:
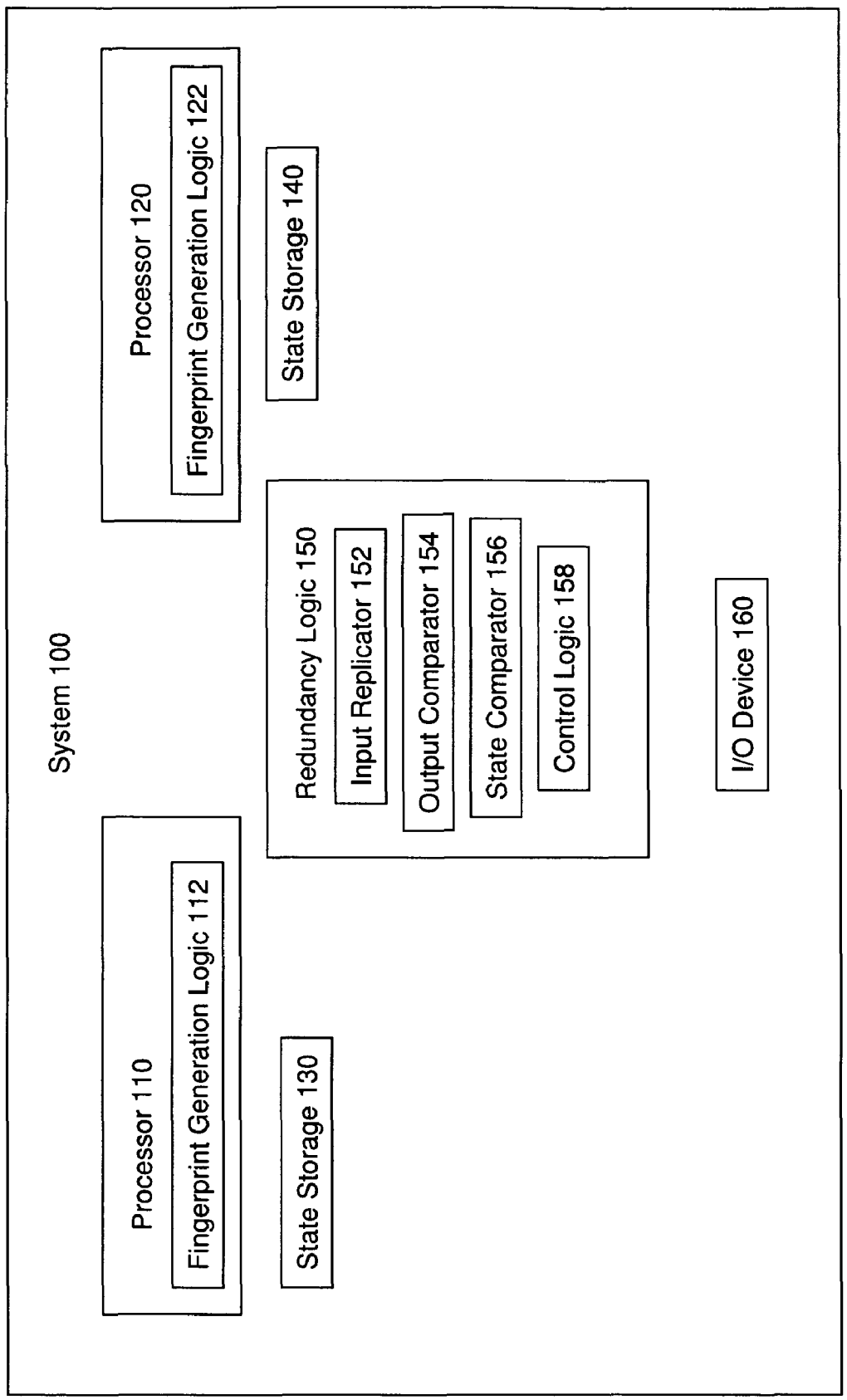
FIG. 1 illustrates a system including state storage according to an embodiment of the present invention.

Embodiments of an invention for synchronizing redundant processors using state history are described. In this description, numerous specific details, such as processor and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention. For example, a complete description of the control of redundant processors is not described, as a number of known approaches may be used in embodiments of the present invention.

As described in the background section, redundancy may be used to mitigate the effects of errors in data processing apparatuses. In some implementations of redundancy, two or more processors may execute identical copies of an instruction stream, but not in lock-step or synchrony with each other, so they may each be executing a different instruction in the instruction stream at the same time. To prevent the invocation of an error handler caused by the delivery of an input or interrupt when the processors are not in synchrony, the processors may be synchronized prior to delivery of the input or interrupt.

One approach to the synchronization of processors is to divide the instruction stream into successive "quanta" of instructions, where each quantum consists of a specific number of instructions. A performance counter or other mechanism may be used to count the retirement of instructions and cause a breakpoint, callback, or other control flow event at the end of each quantum. At each such quantum breakpoint, the processors may be synchronized, so that an input or an interrupt may be delivered to each hardware context at exactly the same instruction boundary in the instruction stream. Synchronization may be performed by running each processor in a special mode, which consists of a complex combination of instruction execution, single stepping, and break-pointing.

Another approach to the synchronization of processors is to use a custom operating system, in which each processor, upon receiving an interrupt, writes a proposal for a "rendezvous" point in the instruction stream to a hardware register in the redundancy control logic. The redundancy control logic determines an acceptable rendezvous point, and writes it back to each processor. Then, each processor schedules the interrupt to be handled at the same rendezvous point. Rendezvous points may only be scheduled within custom code embedded in the operating system and applications. If a processor executed for a long time without an opportunity to schedule a rendezvous point, the redundant processors may need to be synchronized by another method, such as fast forwarding through the instruction stream and/or copying the state of one processor to another.

Embodiments of the present invention provide for an approach to synchronizing processors using state history. This approach may be desirable because it is less complex than running each processor in the special mode described above, and does not require a custom operating system like the rendezvous point approach described above.

FIG. 1 illustrates information processing system 100 according to an embodiment of the present invention. System 100 includes processors 110 and 120, state storages 130 and 140, redundancy logic 150, and I/O device 160. System 100 may also include any number of additional processors, devices, memories, or other components or logic.

Each of processors 110 and 120 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Each of processors 110 and 120 may include multiple threads and multiple execution cores, in any combination.

I/O device 160 may represent any number of any type of I/O, peripheral, or other device, such as a keyboard, mouse, trackball, pointing device, monitor, printer, media card, network interface, information storage device, etc., or any other device capable of providing an interrupt or other input to a processor. I/O device 160 may be embodied in a discrete component, or may be included in an integrated component with any other devices. In one embodiment, I/O device 150 may represent a single function in a multifunctional I/O, peripheral, or other device.

Redundancy logic 150 may include any circuitry, logic, or other structures to cause processors 110 and 120 to enable, assist, or support the redundant operation of processors 110, 120, and any other redundant processors in system 100. In the embodiment of FIG. 1, redundancy logic 150 includes input replicator 152, output comparator 154, state comparator 156, and control logic 158. Input replicator 152 is to replicate interrupts or other inputs from I/O device 150 to be delivered to processors 110 and 120. Output comparator 154 is to compare outputs from processor 110 with outputs from processor 120. State comparator 156 is to compare state information from processor 110 with state information from processor 120, as described below. Control logic 158 is to control the replication of inputs, the comparison of outputs, the handling of output mismatches, the invocation of an error handler, the comparison of state information, the synchronization of processors 110 and 120, and to otherwise control the redundant operation of processors 110 and 120. The replication of inputs, the comparison of outputs, the handling of output mismatches, the invocation of an error handler, the control of synchronization that is not set forth in this description, and any other control of the redundant operation of processors 110 and 120 may be performed according to any known approach, unless otherwise set forth in this description.

State storages 130 and 140 are to store state information for processors 110 and 120, respectively. State storages 130 and 140 may include any type of memory, such as static random access memory, or any other type of information storage medium. State storages 130 and 140 may be included in processors 110 and 120 or separate from processors 110 and 120, and may be combined with each other or separate from each other.

State storage 130 is to store an entry for each instruction in at least a portion of an instruction stream, such as a quantum. For example, if a quantum includes 1,000 instructions, then state storage 130 includes storage for 1,000 entries. Likewise, state storage 140 is to store an entry for each instruction in at least a portion of an instruction stream, such as a quantum. Each entry is to include, as described below, information regarding the state of the processor corresponding to an instruction. Therefore, for any quantum of an instruction stream, state storage 130 may store a history of the state of processor 110 and state storage 140 may store a history of the state of processor 120. Each entry or entry location may also include an index, identifier, or other means for associating an entry with an instruction, and/or the association may be implied by the organization of state storages 130 and 140. For example, the first entry location in state storage 130 may be associated with the first instruction retired in a quantum, and so on.

In one embodiment, state storage 130 is to store an entry that represents the entire state of processor 110 each time processor 110 retires or commits an instruction, and state storage 140 is to store an entry that represents the entire state of processor 120 each time processor 120 retires or commits an instruction. The information that is stored is to reflect the state of the processor, such that it may be compared to information that represents the state of the other processor to determine if the state of processor 110 matches the state of processor 120. For example, the information may include or be derived from the contents of all processor registers or other storage locations within the processor.

To reduce the size of state storages 130 and 140 and the complexity of state comparator 156, the state information corresponding to each retired instruction may be compressed prior to storing it, into a digital signature, a hash value, a fingerprint, or according to any other known approach. In one embodiment, the state information for a retired instruction may include only the changes in state from a previously retired instruction. To control the compression or coding, and/or the storage of state information, processors 110 and 120 may include fingerprint generation logic 112 and 122, respectively.

The implementation of state comparator 154 depends on the format of the entries in state storages 130 and 140. For example, where each entry is a 16-bit fingerprint computed using a cyclic redundancy check function, which summarizes all changes to a previous state, then two such entries may be compared using a 16-bit comparator.

Figure 2:
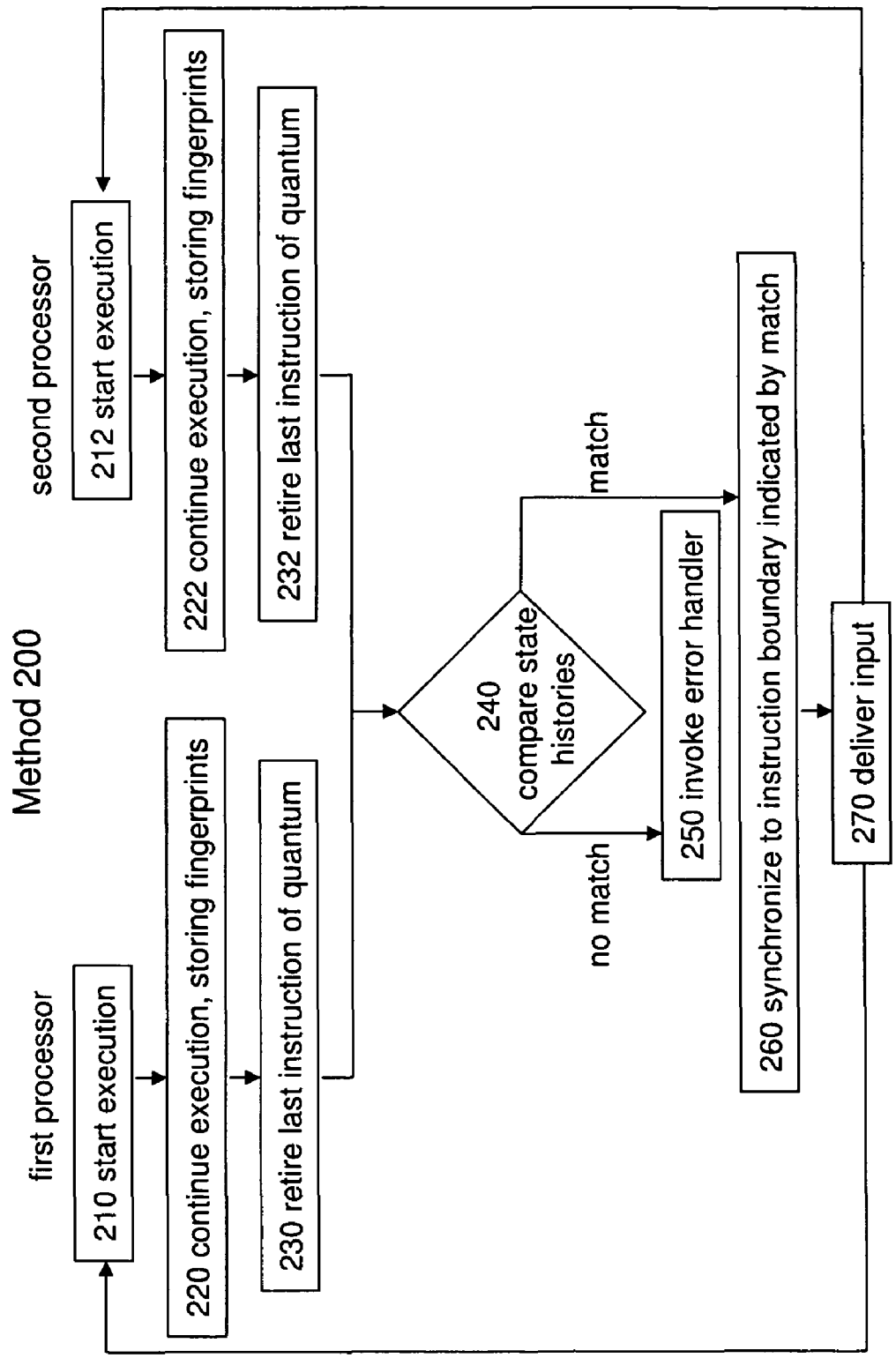
FIG. 2 illustrates a method for synchronizing redundant processors using state history according to an embodiment of the present invention.

FIG. 2 illustrates method 200 for synchronizing processors using state history according to an embodiment of the present invention. Although method embodiments are not limited in this respect, reference may be made to elements of the system embodiment of FIG. 1 in the description of the method embodiment of FIG. 2. Portions or all of method 200 may be performed, or caused to be performed, by control logic 158 or any other control logic within or accessible to system 100, where the control logic may include any type of circuitry, logic, or other structure, such as microcode, hard-wired logic, programmable logic, or firmware.

In box 210, processor 110 begins executing an instruction stream or a portion of an instruction stream. In box 212, processor 112 begins redundantly executing the instruction stream or portion of the instruction stream; in other words, processor 112 begins execution from the same state that processor 110 began execution of the instruction stream in box 210, and at the same instruction boundary in the instruction stream.

In boxes 220 and 222, processors 110 and 112, respectively, continue executing the instruction stream redundantly, but not in lock-step or synchrony with each other, i.e., each processor is allowed to execute instructions independently of the other processor, such they may each be executing a different instruction in the stream at the same time, and/or may execute the same instruction in the stream at a different time. For Furthermore, in box 220, each time an instruction is retired by processor 110, a fingerprint of the processor state is generated by fingerprint generation logic 112, and stored in state storage 130. Likewise, in box 222, each time an instruction is retired by processor 120, a fingerprint of the processor state is generated by fingerprint generation logic 122, and stored in state storage 140.

In box 230, processor 110 retires the last instruction in a quantum. In box 232, processor 112 retires the last instruction in a quantum.

In box 240, the state history of processor 110 is compared to the state history of processor 120, with a goal of finding the most recent match. Box 240 includes comparing at least one entry in state storage 130 with at least one entry in state storage 140, and may be performed according to a number of different approaches. In one embodiment, every entry in a group of entries in state storage 130 may be compared with every entry in a group of entries in state storage 140, in parallel. If more than one match is found, the match involving the most recent entries may be selected. In another embodiment, entries in one of state storages 130 or 140 may be compared with entries in the other of state storages 130 or 140, one at a time, starting with the most recent entries, until a match is found. For example, the most recent entry in state storage 130 may be compared to the most recent entry in state storage 140, then the next most recent entry in state storage 140, and so on, and if no match is found, then the next most recent entry in state storage 130 may be compared to the most recent entry in state storage 140, then the next most recent entry in state storage 140, and so on.

From box 240, if a match is not found, then, in box 250, an error handler may be invoked.

From box 240, if a match is found, then, in box 260, processors 110 and 120 are synchronized to the same instruction boundary, based on the match found in box 240. Since the entries match, they are both associated with the same retired instruction, so each processor is, if necessary, backed up, rolled back, or otherwise set to begin execution from that instruction boundary, according to any known approach, which may include restoring past state. Embodiments of the present invention may include using information from state storage 130 and 140 for restoring past state of processors 110 and 120, respectively.

In box 270, an interrupt or input is delivered to processors 110 and 120.

From box 270, method 200 may continue to boxes 210 and 212, and, having been synchronized in box 260, processors 110 and 112 begin execution from the same retired instruction boundary. Therefore, the timing of the delivery of the interrupt or input does not differ between processors 110 and 120.

Within the scope of the present invention, the method illustrated in FIG. 2 may be performed in a different order, with illustrated boxes omitted, with additional boxes added, or with a combination of reordered, omitted, or additional boxes.

Processors 110 and 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention for synchronizing redundant processors using state history have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a first processor to execute a plurality of instructions;
a first storage to store a first entry representing entire first processor state for each instruction executed by the first processor from the plurality of instructions;
a second processor to execute the plurality of instructions;
a second storage to store a second entry representing entire second processor state for each instruction executed by the second processor from the plurality of instructions;
a controller to synchronize the first processor and the second processor based on at least one entry from the first storage and at least one entry from the second storage.

2. The apparatus of claim 1, wherein the first storage is to store first processor state information for each instruction retired by the first processor from the plurality of instructions and the second storage is to store second processor state information for each instruction retired by the second processor from the plurality of instructions.

3. The apparatus of claim 1, further comprising a comparator to compare an entry in the first storage with an entry in the second storage.

4. The apparatus of claim 3, wherein the controller is to synchronize the first processor and the second processor based on the comparator indicating a match.

5. The apparatus of claim 1, wherein the plurality of instructions is a quantum of instructions in an instruction stream.

6. The apparatus of claim 1, wherein the controller is to synchronize the first processor and the second processor to begin execution from the same instruction boundary.

7. The apparatus of claim 6, further comprising an input replicator to replicate an input to be delivered to the first processor and the second processor.

8. The apparatus of claim 7, wherein the controller is to also to deliver a replicated input to the first processor and the second processor after synchronizing the first processor and the second processor.

9. The apparatus of claim 8, wherein the replicated input is an interrupt.

10. The apparatus of claim 1, wherein the controller is to synchronize the first processor and the second processor to begin execution from the same state.

11. The apparatus of claim 10, wherein the controller is to synchronize the first processor and the second processor to begin execution from the same state by restoring state of one of the first processor from the first storage and the second processor from the second storage.

12. The apparatus of claim 1, the first processor includes first state storage logic to compress and store the first processor state information and the second processor includes second state storage logic to compress and store the second processor state information.

13. A method comprising:
   executing, by a first processor, a plurality of instructions;
   executing, by a second processor, the plurality of instructions;
   storing information representing state of the first processor at the retirement, by the first processor, of each instruction in the plurality of instructions;
   storing information representing state of the second processor at the retirement, by the second processor, of each instruction in the plurality of instructions;
   synchronizing the first processor and the second processor based on stored information representing past state of the first processor and stored information representing past state of the second processor.

14. The method of claim 13, further comprising comparing stored information representing past state of the first processor with stored information representing past state of the second processor.

15. The method of claim 14, wherein synchronizing is based on a match between stored information representing past state of the first processor and stored information representing past state of the second processor.

16. The method of claim 15, wherein synchronizing includes causing the first processor and the second processor to begin execution from the instruction boundary indicated by the match.

17. The method of claim 16, further comprising delivering an input to the first processor and the second processor after synchronizing and before beginning execution from the instruction boundary indicated by the match.

18. The method of claim 17, wherein synchronizing includes restoring state of one of the first processor from stored information representing past state of the first processor and the second processor from stored information representing past state of the second processor.

19. A processor comprising:
   an execution core to execute a plurality of instructions; and
   storage to store entire state information for each instruction retired by the execution core, the storage accessible to a controller to synchronize the processor with a redundant processor.

20. The processor of claim 19, further comprising logic to store the state information.

* * * * *